United States Patent [19]
Cucci

[11] Patent Number: 5,713,498
[45] Date of Patent: Feb. 3, 1998

[54] ROOF TOP CARGO CONTAINER

[76] Inventor: Charles A. Cucci, 223 Buena Vista Dr., Ringwood, N.J. 07456

[21] Appl. No.: 662,674
[22] Filed: Jun. 14, 1996
[51] Int. Cl.$^6$ ............................................. B60R 9/055
[52] U.S. Cl. ........................ 224/328; 224/321; 224/309
[58] Field of Search ............................ 224/309, 321, 224/328; D12/410, 413; 220/628, 633, 335

[56] References Cited

U.S. PATENT DOCUMENTS

| | | |
|---|---|---|
| 2,387,779 | 10/1945 | Strauss . |
| 2,440,821 | 5/1948 | Godwin . |
| 3,095,129 | 6/1963 | Kerr ............................................ 224/328 |
| 3,132,780 | 5/1964 | Binding . |
| 3,593,898 | 7/1971 | DiForte . |
| 4,253,595 | 3/1981 | Tiffany ........................................ 224/328 |
| 4,261,496 | 4/1981 | Mareydt et al. . |
| 4,345,706 | 8/1982 | Bénit . |
| 4,416,406 | 11/1983 | Bopeney . |
| 4,420,105 | 12/1983 | Nepper ........................................ 224/328 |
| 4,632,289 | 12/1986 | Morissette . |
| 5,067,625 | 11/1991 | Numata ........................................ 220/335 |
| 5,096,107 | 3/1992 | VanSon ........................................ 224/328 |
| 5,160,075 | 11/1992 | Moscovitch ................................ 224/328 |
| 5,285,942 | 2/1994 | Wills . |
| 5,456,395 | 10/1995 | Katz et al. . |
| 5,588,572 | 12/1996 | Cronce et al. .............................. 224/321 |

FOREIGN PATENT DOCUMENTS

| | | | |
|---|---|---|---|
| 1089420 | 11/1980 | Canada ......................................... | 224/328 |
| 989297 | 9/1951 | France .......................................... | 224/328 |
| 1011725 | 12/1965 | United Kingdom ........................... | 224/328 |

*Primary Examiner*—Henry J. Recla
*Assistant Examiner*—Gregory M. Vidovich

[57] ABSTRACT

A cargo container is provided for being removably mounted to a roof rack system of an automobile. The container includes a body portion having a bottom, a continuous sidewall having a peripheral edge and extending up from the bottom at the peripheral edge, an interior space defined by the continuous sidewall and the bottom, a top releasably engageable to the continuous sidewall for providing access to the interior space, and a lip along the body portion to interconnect the peripheral edge and the bottom. The lip is constructed to extend beyond the peripheral edge to coact with at least one strut member of the roof rack system so as to be releasably secured in the space between the strut and the automobile roof.

13 Claims, 3 Drawing Sheets

ROOF TOP CARGO CONTAINER

BACKGROUND OF THE INVENTION

1. Field of the Invention

The present invention relates to storage containers which are adapted to be removably mounted to a roof of an automobile or coact with an existing roof rack system of the automobile.

2. Background of the Invention

Roof top cargo containers and rack systems for automobiles to carry various types of equipment are known, for example:

| U.S. Pat. No. | Inventor(s) |
|---|---|
| 2,387,779 | Strauss |
| 2,440,821 | Godwin |
| 3,132,780 | Binding |
| 3,593,898 | Diforte |
| 4,261,496 | Mareydt et al. |
| 4,345,706 | Benit |
| 4,416,496 | Popeney |
| 4,632,289 | Morissette |
| 5,285,942 | Wills |
| 5,456,395 | Katz et al. |

These patents disclose devices which carry equipment on the roof of the automobile so that the equipment does not occupy the U.S. Pat. No. 2,387,779 to Strauss discloses a carrier unit for a car. The carrier includes griping members for securing the carrier to the side rails of the automobile roof. The carrier is not constructed to coact with front or rear support bars already existing on the car's roof.

U.S. Pat. No. 2,440,821 to Godwin, similar to Strauss, discloses devices for securing a luggage carrier to an automobile roof rack by adhering the carrier to the side rails of the vehicle. Suction devices hold the carrier above the vehicle.

U.S. Pat. No. 3,132,780 to Binding discloses a rack which is supported over the roof of a vehicle on rain gutters of the vehicle.

U.S. Pat. No. 3,593,898 to Diforte discloses a lockable enclosure for a vehicle's spare tire, the enclosure consisting of a two-piece cover with a bottom for carrying the spare tire, and a top lockable to the bottom covering the tire. The bottom of the carrier is permanently affixed to the roof of the vehicle by a bolt.

U.S. Pat. No. 4,261,496 to Mareydt et al. discloses a ski rack which is adjustably positioned along a track secured to the roof of a vehicle.

U.S. Pat. No. 4,345,706 to Benit discloses an automobile luggage rack and carrier with a platform for its primary base. The base includes channel members which fit on the roof and which are upholstered so as not to damage the roof. A lid for the carrier rack is hinged to a lip formed on the base so that when the lid is unlocked and opened, the hinges allow the top to be easily moved for loading and unloading.

U.S. Pat. No. 4,416,496 to Popeney discloses mounting a luggage rack with a pair of spaced rails disposed on tracks secured to the roof of the vehicle.

U.S. Pat. No. 4,632,289 to Morissette discloses a collapsible load carrier system having a plurality of cross rails supported on suction cup feet. Side straps are provided to further support the carrier by engagement to the undersigned of the roof gutters.

U.S. Pat. No. 5,285,942 to Wills discloses a ski carrier which is mounted to the roof of a vehicle by securing straps to a rain gutter or door frame of the vehicle. The bottom of the carrier rests on the roof of the vehicle.

U.S. Pat. No. 5,456,395 to Katz et al. discloses a roof carrier having a rectangular frame supported on the roof of a car. The frame includes members which are collapsible and a flexible net formed of bands connected between the frame members.

Among the references above, none are constructed to coact with a roof rack system with movable transverse bars for mounting thereto, such as for example the existing rack systems of the Ford Taurus and Mercury Sable automobiles. Certain of the devices disclosed also require that the structure of the car roof be altered with holes for mounting of the devices to the roof. Such mounting compromises the structural integrity of the roof and may void the automobile's warranty. In addition, such mounting leaves holes in the roof which must be repaired if the device is removed.

The roof top cargo container of the present invention is constructed to be removably mounted to the existing structure of an automobile roof rack system and is adapted to be disposed between and coact with front and rear transverse bars of the roof rack system.

OBJECTS AND SUMMARY OF THE INVENTION

It is an object of the present invention to provide a roof top cargo container adapted to be removably mounted to a roof or roof rack system of an automobile, such as those rack systems installed on the Ford Taurus and Mercury Sable automobiles.

It is another object of the present invention to provide a roof top container which is retrofitable to the roof rack systems without altering the structure of the roof or the roof rack system.

It is another object of the present invention to provide a roof top container which is aerodynamically shaped to substantially reduce wind drag when mounted to the roof of an automobile.

It is another object of the present invention to provide a container constructed with an arcuate lip portion designed to coact with an existing roof rack system of an automobile so that the container can be removably mounted to the rack system above the roof of the automobile.

It is another object of the present invention to provide a container which can be opened from either of its sides.

It is another object of the present invention to provide a container which is formed with a bottom surface contoured to rest against the roof top or roof rack system of the automobile.

It is another object of the present invention to provide a container which is lightweight, inexpensive to manufacture and maintain and easily transportable to and from the automobile.

It is another object of the present invention to provide a container constructed with a cover portion and a body portion, the cover portion hingedly and detachably connected to the body portion.

It is a further object of the present invention to provide a container having tie-down members constructed and arranged to coact with and releasably engage the roof rack system of an automobile.

To accomplish the foregoing objects, the roof top cargo container of the present invention consists of: a body portion having a bottom, a continuous sidewall having a peripheral edge and extending up from the bottom at the peripheral edge, an interior space defined by the continuous sidewall and the bottom, a top releasably engageable to the continuous sidewall for providing access to the interior space, and a lip extending along the body portion to interconnect the peripheral edge and the bottom of the body portion. The lip extends beyond the peripheral edge to coact with a strut of an automobile roof rack system to be releasably secured in a space between the strut and the automobile roof.

Additional features of the invention include cushionable material disposed along the lip to provide for a more secure coaction or wedging effect between the lip and the roof rack struts, and also to reduce vibration and any damage to the cargo carrier and the struts.

BRIEF DESCRIPTION OF THE DRAWING

For a more complete understanding of the present invention, reference is made to the following detailed description of the invention considered in connection with the accompanying drawings, of which.

DETAILED DESCRIPTION OF THE INVENTION

Figure 1:
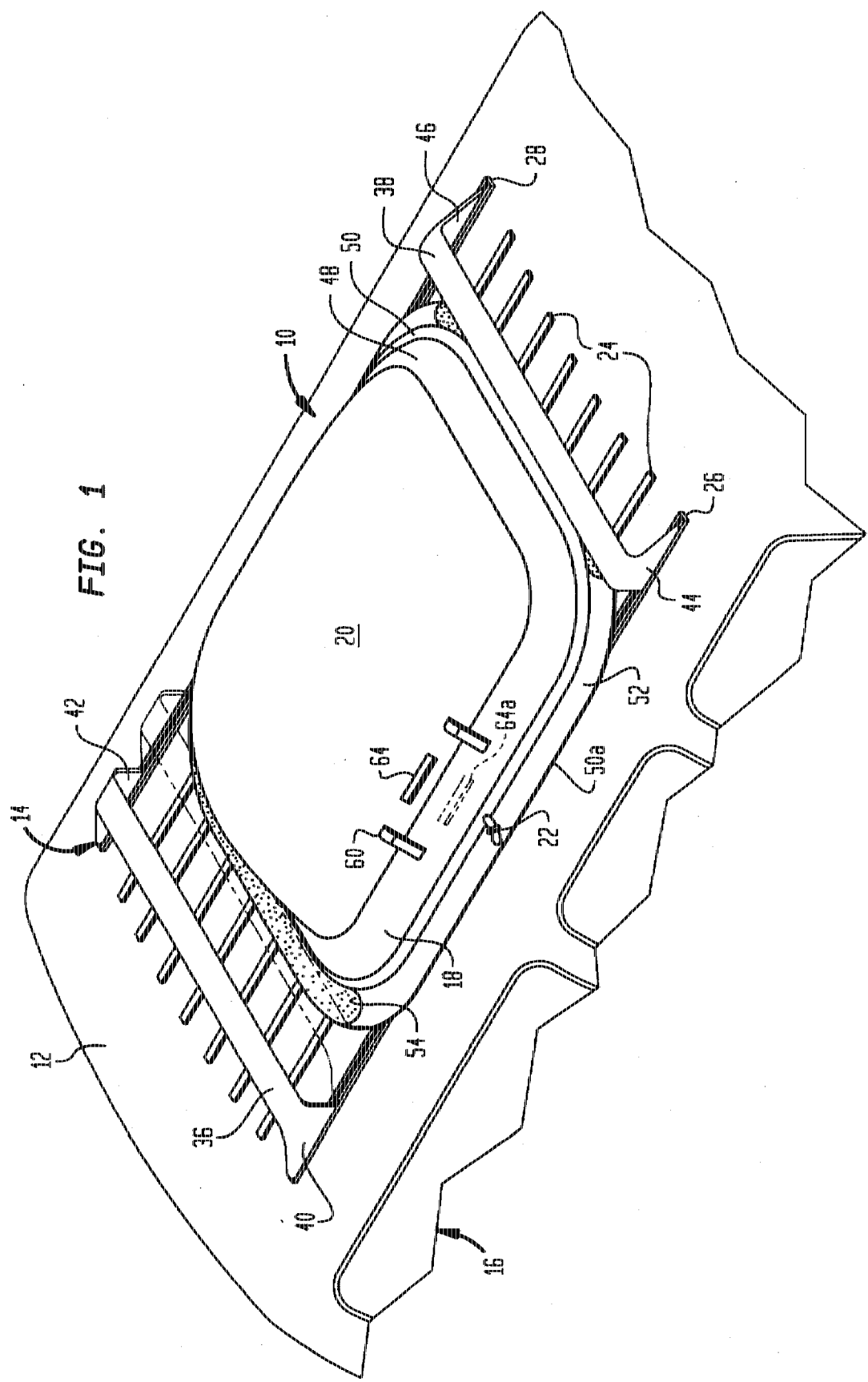
FIG. 1 is a top perspective view of a preferred embodiment of a roof top cargo container according to the present invention which is removably mounted to a rack system of an automobile.

Referring to FIG. 1, the roof top cargo container (the "container") 10 of the present invention is constructed to be removably mounted to a roof 12 or roof rack system 14 of an automobile 16. The container 10 consists of a body portion 18 constructed and adapted to be removably mounted to the roof 12 or the rack system 14, a top portion 20 releasably engageable to the body portion 18, and mechanical tie-down assembly 22 which releasably attaches the body portion 18 to existing mounting assemblies of the roof rack 14. Although the container 10 is disclosed overlying particular portions of the rack system 14 of the automobile, it is understood that the container 10 is designed to also be disposed directly on top of the automobile roof 12 when it is mounted thereto.

A brief discussion regarding the elements of the automobile roof rack system 14 is provided to better understand the container 10 of the present invention.

Still referring to FIG. 1, the roof rack system 14 on certain automobiles, and in particular the Ford Taurus and Mercury Sable models, consists of a plurality of support bars 24 arranged lengthwise along the longitudinal axis of the automobile roof 12. The support bars 24 are shown separate and discrete from each other and preferably parallel to each other as shown in FIG. 1, although the distance between each one of the support bars 24 and a neighboring support bar can vary depending upon the width of the roof 12 and the size of the container 10 being used. The two outermost support bars 26,28 are of a different construction than the support bars 24 and will be referred to as the guide support bars 26,28 which have a purpose discussed hereinafter. In most instances, the support bars 24,26,28 are formed from a high density polymer or an alloy.

Figure 2:
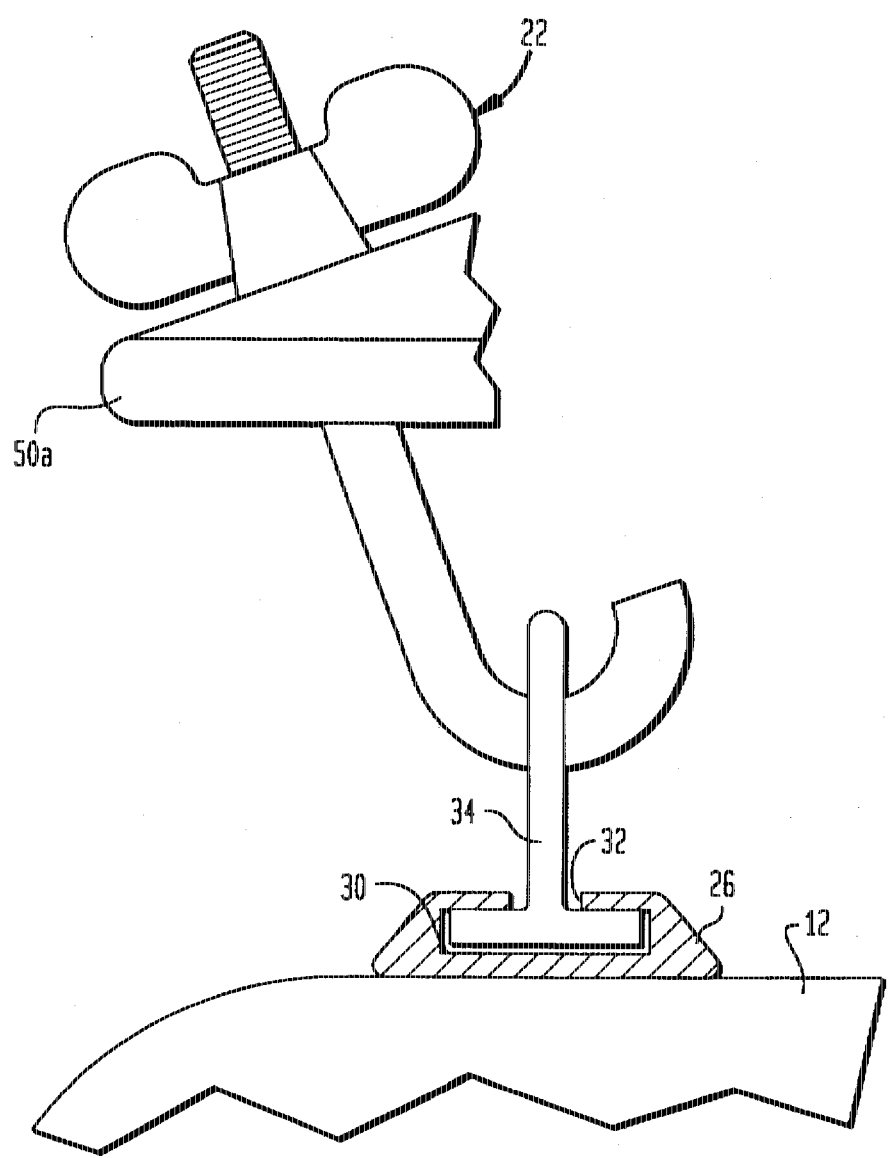
FIG. 2 is a side plan, partial cross-sectional view of a tie-down member of the present invention.

Referring also to FIG. 2, one of the guide support bars 26,28 is more particularly shown. Each one of the guide support bars 26,28 is constructed with an internal channel 30 which is exposed to the exterior of the corresponding guide support bar 26,28. The channel is formed with a width greater than an opening 32 to the channel 30, which channel which has closed opposed ends. A mechanical mounting member 34 is slidebly disposed in each one of the channels 30 of the side support bars 26,28. The mounting member 34 can be any of the known mechanical fasteners, such as a cleat, clevis, etc. The construction of the channel 30 and shape of the mounting member 34 prevents the member 34 from being pulled from the channel 30, and in that regard, opposed ends of each one of the guide support bars 26,28 are closed off so that the mounting members 34 do not slide out of the channels 30 at each end of the corresponding guide support bar 26,28.

Although in FIGS. 1 and 2 the support bars 24,26,28 are shown mounted to an exterior surface of the automobile roof 12, it is understood that the guide support bars 26,28 can be mounted below the exterior surface of the roof 12, so that the opening 32 in communication with the channel 30 is at the exterior surface of the roof.

A pair of struts 36,38 are mounted to the guide support bars 26,28 for sliding movement over the support bars 24. At least one of the struts 36,38 is movable along the guide support bars 26,28 with respect to the other guide support bar as shown by the broken lines in FIG. 1. The struts 26,28 can be made of high density polymer or alloy. The strut 36 is formed with opposed ends 40,42, while the strut 38 is formed with opposed ends 44,46. Each one of the struts 36,38 is positioned over the support bars 24 and preferably transverse thereto such that corresponding ends 40,42 and 44,46 are disposed for sliding movement in the channels 30. As shown in FIG. 1, by way of example, at least one of the struts, and in this instance strut 36, is movable along the channels 30 with respect to the other strut 38. The struts 36,38 each have releasable engagement means (not shown) to lock the strut into position in the channel 30 with respect to the other strut.

Figure 3:
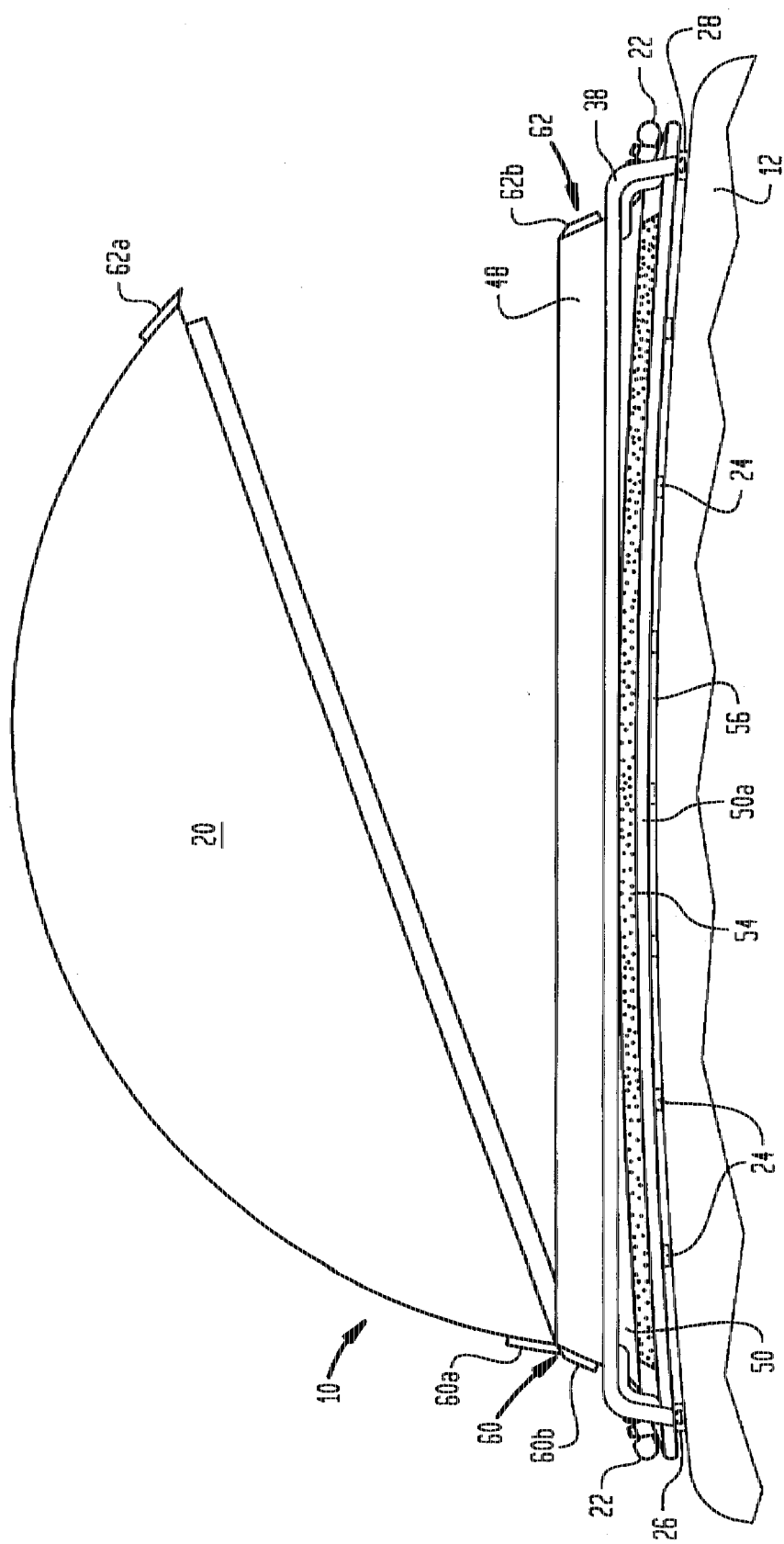
FIG. 3 is an end plan view of the present invention shown in FIG. 1 mounted to the roof rack system.

Referring also to FIG. 3, the body of the container 10 includes a continuous sidewall 48 which tapers to a smooth, peripheral edge 50 which extends to an arcuate lip 50a. An upper surface 52 of the lip 50a is provided with a cushioning material 54, such as high density foam, rubber, etc., which extends substantially over the opposed ends of the body portion 18. The cushioning material 54 can also be arranged along the entire upper surface 52 of the lip 50a and the peripheral edge 50. The lip 50a extends to and interconnects a bottom portion 56 of the body 18 with the peripheral edge 50.

As shown in FIG. 3, each of the opposed sides of the body 18 at the peripheral edge 50 includes a mechanical tie-down assembly 22 to releasably engage the mechanical mounting member 34 disposed in channel 30 of the guide support bars 26,28. As shown, the assembly 22 includes wing or butterfly nut/hook combinations to releasably engage the body portion 18 to the support bars 24. The peripheral edge 50a of the body portion 18 is tapped to receive the mechanical assemblies 22.

The top 20 is hingedly mounted to the body 18 by, for example, hinges 60,62 at opposed sides of the container 10. The body portion 18 and the top 58 each have mounted thereto corresponding portions of the assemblies 60,62. The hinge assemblies 60,62 each consist of two mating portions 60a,60b and 62a,62b as shown more particularly in FIG. 3, which are releasably engageable to each other to permit the top 20 to be hingedly pivoted with respect to either of the hinge assemblies 60,62. The hinge or buckle assembly can be lockable. In this manner, the top 58 can be opened from either side, or entirely removed from the body 18, if desired. A cutout 64 (only one of which is shown due to the perspective of the drawing) is formed in the top 20, at opposed sides thereof as shown in FIG. 1. The cutout 64 facilitates gripping and moving of the top 20 to and from the automobile. Alternatively, the cutout 64 can be formed in the sidewall 20 of the body portion 18 as at 64a.

The shape of the container 10 can be rectangular or any other shape as desired. The preferred material from which the container 10 is constructed is that of fiberglass or other plastic material strong enough to withstand the stresses when mounted to the roof rack and variations in the climate.

Approximate dimensions are overall length of 53 inches, width of 42 inches and height of 21 inches, although these dimensions can vary depending upon the size required for the container 10.

The bottom 56 of the container 10 can be slightly convex to conform to the contour of the existing rack system 14 or the automobile roof 12. It is preferred that the bottom 56 be provided also with cushionable material 54 to reduce damage to the existing rack system 14 or the automobile finish.

In operation, the container 10 of the present invention can be stored in a garage, attic or the automobile for that matter. The container 10 is opened from either side, or the top 20 completely removed from the body portion 18, and loaded with equipment. The top 20 is then secured to the body portion 18 after which the cutout 64 handles are grasped and the container 10 is positioned on the existing roof rack system 14 of the automobile 16 intermediate the transverse struts 36,38. The container 10 is moved against one of the transverse struts and the arcuate lip 50a positioned in the space between the transverse strut 38 and the support bars 24. The cushioning material 54 will provide for a friction or wedge fit of the lip 50a between the transverse strut 38 and the underlying support bars 24 of the rack system 14. The other transverse strut 36 is slidably moved into position over another area of the lip 50a at an opposite side of the body portion 18 so that the lip 50a is similarly wedged by the cushioning material into the space between the lip 50a and the support bars 24. The strut 36 is then wedged into position between the struts 36,38. The mechanical tie-down assemblies 22 and complementary mechanical mounting members 34 (in the channels 30) are releasably engaged to further secure the container 10 to the roof rack system 14.

The container 10 can be manufactured in different colors, customized with a selected design or graphics and/or formed of materials similar to those used in the existing roof rack.

Although the invention has been described with reference to certain preferred embodiments, it will be understood that many variations and modifications may be made consistent with the broad concept and principles of the invention. It is intended that the preferred embodiments and all such variations and modifications be included within the scope and spirit of the invention, as defined in the following claims.

What is claimed is:

1. A cargo container adapted to be removably mounted to a roof of an automobile, the roof having a pair of independent struts each of which is spaced from the roof and at least one of the struts being movable with respect to the other strut, the cargo container comprising:
   a body portion comprising:
      a bottom constructed and arranged to conform to the roof of the automobile,
      a continuous sidewall extending up from the bottom, the continuous sidewall having a peripheral edge,
      an interior space defined by the continuous sidewall and the bottom of the body portion,
      first cushioning material disposed on the bottom to contact the roof,
      a top releasably engageable to the continuous sidewall to provide access to the interior space,
      a hinge assembly arranged at opposed sides of the body portion for interconnecting the top and the continuous sidewall, wherein the top can be pivoted open at the hinge assembly for access to the interior space,
      at least one mechanical fastening assembly associated with the continuous sidewall, the mechanical fastening assembly comprising a securing member releasably engageable with a complementary mounting portion at the automobile roof;
   a lip interconnecting the peripheral edge and the bottom, the lip having a surface area extending beyond the top, the peripheral edge, and the bottom to coact with the at least one of the struts and be releasably secured in the space between the strut and the automobile roof; and
   second cushioning material disposed on the surface area of the lip to contact the at least one strut and coact therewith.

2. A cargo container adapted to be removably mounted to a roof of an automobile, the roof having a pair of independent struts each of which is spaced from the roof and at least one of the struts being movable with respect to the other strut, the cargo container comprising:
   a body portion comprising:
      a bottom,
      a continuous sidewall extending up from the bottom, the continuous sidewall having a peripheral edge,
      an interior space defined by the continuous sidewall and the bottom of the body portion,
      a top releasably engageable to the continuous sidewall to provide access to the interior space; and
   a lip interconnecting the peripheral edge and the bottom, the lip having a surface area extending beyond the top, the peripheral edge, and the bottom to coact with at least one of the struts and be releasably secured in the space between the strut and the automobile roof.

3. The cargo container according to claim 2, further comprising:
   cushioning material disposed on portions of the surface area of the lip that coact with the strut.

4. The cargo container according to claim 2, further comprising:
   cushioning material disposed along the surface area of the lip.

5. The cargo container according to claim 2, further comprising:
   a hinge assembly arranged at opposed sides of the body portion for interconnecting the top and the continuous sidewall, wherein the top can be pivoted open at either one of the hinge assemblies for access to the interior space.

6. The cargo container according to claim 2, further comprising:
   at least one mechanical fastening assembly associated with the peripheral edge, the mechanical fastening assembly comprising a securing member releasably engageable with a complementary mounting portion of the automobile roof.

7. The cargo container according to claim 2, wherein the bottom is constructed and arranged to conform to the contour of the roof of the automobile.

8. The cargo container according to claim 2, wherein the body portion has a substantially rectangular shape.

9. The cargo container according to claim 2, further comprising:
   a recess formed at opposed sides of the top to facilitate gripping the top.

10. The cargo container according to claim 2, further comprising:
    a recess formed at opposed sides of the continuous sidewall of the body portion to facilitate gripping the body portion.

11. The cargo container according to claim 2, wherein the bottom further comprises:
    cushioning material for contacting the roof of the automobile.

12. The cargo container according to claim 2, wherein the lip is integrally formed with the peripheral edge and the bottom.

13. A cargo container adapted to be removably mounted to a roof of an automobile, the roof having a plurality of support members, at least one of the support members formed with a channel therein in which a securing member is slidably mounted, and a pair of independent struts each of which is spaced from the roof and mounted transverse to the support members, at least one of the struts being movable with respect to the other strut, the cargo container comprising:

a body portion comprising:

a bottom constructed and arranged to conform to the contour of the roof and be supported on the plurality of support members, a continuous sidewall extending up from the bottom and having a peripheral edge, an interior space defined by the continuous sidewall and the bottom of the body portion, a top releasably engageable to the continuous sidewall to provide access to the interior space;

a lip interconnecting the peripheral edge and the bottom, the lip having a surface area extending beyond the top, the peripheral edge, and the bottom to coact with the at least one of the struts and be releasably secured in the space between the strut and the support members; and a mechanical fastening assembly associated with the peripheral edge and releasably engageable with the securing member disposed in the channel of one of the support members.

* * * * *